Figure 1:
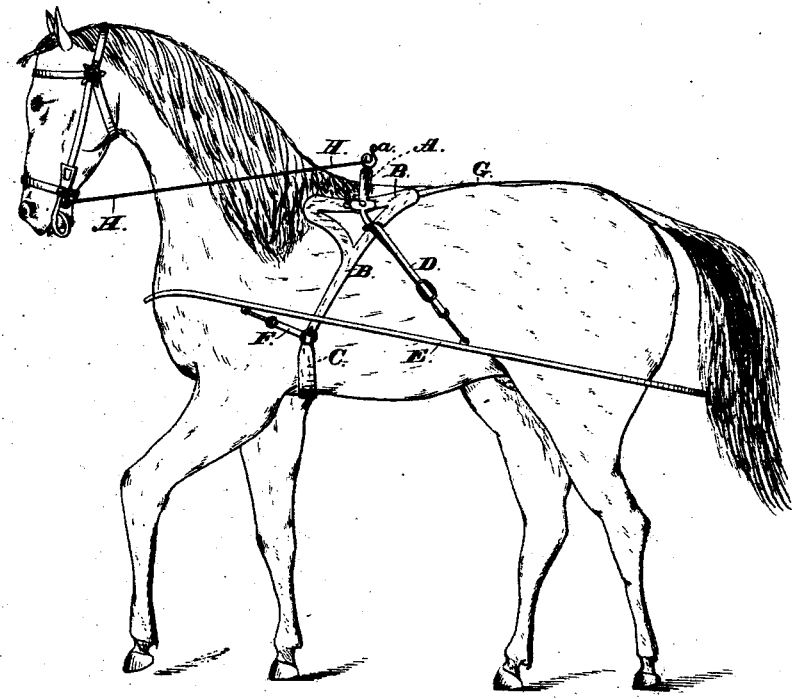

(Model.)

2 Sheets—Sheet 1.

A. RITTENHOUSE.
HARNESS.

No. 245,219.          Patented Aug. 2, 1881.

WITNESSES:
Jas. E. Hutchinson
Henry C. Hazard

INVENTOR
A. Rittenhouse, by
Prindle & Roy his Att'ys (Model.)
2 Sheets—Sheet 2.
A. RITTENHOUSE.
HARNESS.
No. 245,219.
Patented Aug. 2, 1881.
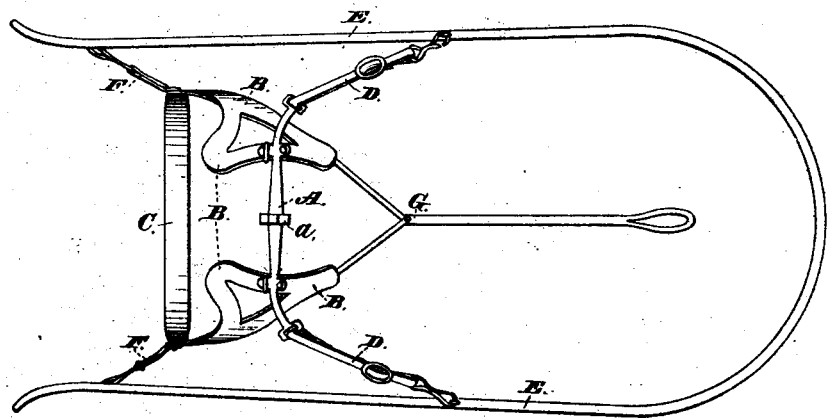
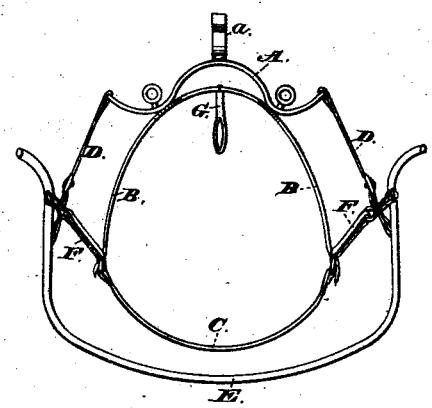

UNITED STATES PATENT OFFICE.

ALVAH RITTENHOUSE, OF PHILADELPHIA, PENNSYLVANIA.

HARNESS.

SPECIFICATION forming part of Letters Patent No. 245,219, dated August 2, 1881.

Application filed January 17, 1881. (Model.)

*To all whom it may concern:*

Be it known that I, ALVAH RITTENHOUSE, of Philadelphia, in the county of Philadelphia, and in the State of Pennsylvania, have invented certain new and useful Improvements in Harness; and I do hereby declare that the following is a full, clear, and exact description thereof, reference being had to the accompanying drawings, making a part of this specification, in which—

Figure 1 is a side elevation of my improved harness in position upon a horse. Fig. 2 is a plan view of the upper side of said harness removed from the horse, and Fig. 3 is a front elevation of the same.

Letters of like name and kind refer to like parts in each of the figures.

My invention is an improvement upon a harness for which Letters Patent No. 208,636 were issued to me upon the 1st day of October, A. D. 1878; and it consists, as a means for connecting a horse to or with a vehicle, in a saddle-iron having a broad bearing at its upper end, a saddle-tree and girth, which encircle the body of the horse, and traces that are connected with said saddle-tree and extend outward, rearward, and downward to and are connected with the shafts, whereby the strain is thrown upon the back of the horse, substantially as and for the purpose hereinafter specified.

In the harness covered by the hereinbefore-named patent the body of the horse was encircled by means of a flexible girth, and the traces were attached to the same midway between the level of the shafts and the back of the horse, the operation of said traces being to tighten said girth in proportion to the strain thrown upon them.

In my present harness I employ a saddle-tree, A, which is arched to span the backbone of the horse, and at each of its ends is pivoted or hinged upon a saddle-iron, B, that has a broad bearing at its upper end, and at its lower end is connected with a girth, C, said girth passing beneath the horse and performing the usual office of such part.

To each end of the saddle-tree A, which ends are extended outward beyond the pivotal connection with the saddle-iron, is secured one end of a trace, D, which from thence extends outward, downward, and rearward, and has its opposite end connected with the shafts E of a vehicle.

From the girth C, below the shafts E, a strap, F, extends upward, outward, and forward, and is connected to or with said shafts, preferably at the lower side of the same.

A crupper, G, is preferably connected with the rear upper corners of the saddle-irons B, and a check-rein, H, is connected with a hook, *a*, at the top of the saddle-tree A; but such parts in no manner affect the operation of the harness.

If, now, the horse is moved forward, the downward and rearward draft of the traces causes the saddle-irons B, which form bearings for the saddle-tree, to bear firmly upon the back of the horse, and, without slipping, to sustain any strain that would be caused by any ordinary carriage with its load. When the motion of the horse is checked or it is backed, the strain is transferred from the traces D to the holdback-straps F, and through the same to the girth C.

When my harness is used as described the chest and shoulders of the horse are left entirely free from interference and perform their functions with as much ease as though no harness was used. The backbone of the horse is also relieved from pressure or injury, while from the form of the saddle and its attachments the horse is not heated by its use.

This harness may be combined with any of the usual forms of collar, if desired, for heavy work; but when used with carriages no additional parts are required.

Having thus fully set forth the nature and merits of my invention, what I claim as new is—

As a means for connecting a horse to or with a vehicle, an arched saddle-tree, a saddle-iron having a broad bearing at its upper end, a girth connected to the lower end of said saddle-iron, and traces that are connected at one end to the ends of the saddle-tree and extend outward, downward, and rearward therefrom, and are connected at their other ends to the shafts, whereby the strain is thrown upon the back of the horse, substantially as and for the purpose specified.

In testimony that I claim the foregoing I have hereunto set my hand this 16th day of August, 1878.

ALVAH RITTENHOUSE.

Witnesses:
GEO. S. RITTENHOUSE,
BENJ. F. RITTENHOUSE.